United States Patent
Hetzler et al.

(10) Patent No.: US 7,788,569 B2
(45) Date of Patent: *Aug. 31, 2010

(54) AUTONOMIC PARITY EXCHANGE

(75) Inventors: Steven Robert Hetzler, Los Altos, CA (US); Daniel Felix Smith, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 312 days.

This patent is subject to a terminal disclaimer.

(21) Appl. No.: 11/778,644

(22) Filed: Jul. 16, 2007

(65) Prior Publication Data

US 2008/0126890 A1 May 29, 2008

Related U.S. Application Data

(62) Division of application No. 10/619,648, filed on Jul. 14, 2003, now Pat. No. 7,254,754.

(51) Int. Cl.
*H03M 13/00* (2006.01)

(52) U.S. Cl. .................... 714/777; 714/800

(58) Field of Classification Search ............... 714/777, 714/800
See application file for complete search history.

(56) References Cited

U.S. PATENT DOCUMENTS

| | | | |
|---|---|---|---|
| 5,128,944 A * | 7/1992 | Flaherty et al. ............ 714/6 |
| 5,134,616 A | 7/1992 | Barth, Jr. et al. | |
| 5,134,619 A | 7/1992 | Henson et al. | |
| 5,148,432 A | 9/1992 | Gordon et al. | |
| 5,204,836 A * | 4/1993 | Reed ..................... 365/200 |
| 5,257,391 A | 10/1993 | DuLac et al. | |

(Continued)

FOREIGN PATENT DOCUMENTS

EP 0 518 603 B1 12/1992

(Continued)

OTHER PUBLICATIONS

G.A. Alvarez et al., Tolerating Multiple Failures in RAID Architectures with Optimal Storage and Uniform Declustering, Computer Architecture News (USA), V. 25, #2, pp. 62-72, May 1972.

(Continued)

*Primary Examiner*—M. Mujtaba K Chaudry
(74) *Attorney, Agent, or Firm*—Joseph P. Curtin; Mohammed Kashef

(57) ABSTRACT

Error tolerance is increased for a storage system having a plurality of arrays by making local redundancy in a selected array globally available throughout the storage system. To achieve the increased error tolerance, a donor array is selected from the plurality of arrays when the difference between a minimum distance of the donor array and a minimum distance of a recipient array is greater or equal to 2. A donor storage unit is selected in the donor array and recipient information is then rebuilt from the recipient array on the selected storage unit. The selected storage unit is indicated to the donor array as having been donated before the lost information is rebuilt on the selected storage unit. Preferably, the minimum Hamming distance of the recipient array is $d \geq 2$ before the donor array is selected from the plurality of arrays.

22 Claims, 3 Drawing Sheets

U.S. PATENT DOCUMENTS

| | | | |
|---|---|---|---|
| 5,301,297 A | | 4/1994 | Menon et al. |
| 5,379,417 A | * | 1/1995 | Lui et al. .................... 713/300 |
| 5,398,253 A | | 3/1995 | Gordon |
| 5,485,571 A | * | 1/1996 | Menon ......................... 714/7 |
| 5,506,977 A | | 4/1996 | Jones |
| 5,546,535 A | | 8/1996 | Stallmo et al. |
| 5,579,475 A | | 11/1996 | Blaum et al. |
| 5,611,069 A | | 3/1997 | Matoba |
| 5,617,425 A | | 4/1997 | Anderson |
| 5,787,460 A | | 7/1998 | Yashiro et al. |
| 5,793,683 A | * | 8/1998 | Evans ......................... 365/200 |
| 5,835,938 A | | 11/1998 | Yamamoto et al. |
| 5,835,940 A | | 11/1998 | Yorimitsu et al. |
| 5,848,229 A | | 12/1998 | Morita |
| 5,862,158 A | | 1/1999 | Baylor et al. |
| 5,867,433 A | * | 2/1999 | Shen et al. .................. 365/200 |
| 5,937,428 A | | 8/1999 | Jantz |
| 5,954,822 A | | 9/1999 | Yashiro et al. |
| 6,070,249 A | * | 5/2000 | Lee .............................. 714/6 |
| 6,138,125 A | * | 10/2000 | DeMoss .................... 707/202 |
| 6,154,853 A | | 11/2000 | Kedem |
| 6,161,165 A | | 12/2000 | Solomon et al. |
| 6,212,682 B1 | | 4/2001 | Kuno |
| 6,269,453 B1 | * | 7/2001 | Krantz ......................... 714/6 |
| 6,275,898 B1 | * | 8/2001 | DeKoning ................. 711/114 |
| 6,279,138 B1 | | 8/2001 | Jadav et al. |
| 6,289,471 B1 | * | 9/2001 | Gordon ......................... 714/6 |
| 6,353,895 B1 | | 3/2002 | Stephenson |
| 6,408,400 B2 | | 6/2002 | Taketa et al. |
| 6,530,004 B1 | * | 3/2003 | King et al. .................. 711/165 |
| 6,581,135 B2 | | 6/2003 | Nakano et al. |
| 6,687,791 B2 | | 2/2004 | Morrison |
| 6,775,794 B1 | * | 8/2004 | Horst et al. .................. 714/42 |
| 6,957,313 B2 | | 10/2005 | Hsia et al. |
| 2002/0035667 A1 | | 3/2002 | Bruning, III et al. |

FOREIGN PATENT DOCUMENTS

| | | |
|---|---|---|
| JP | 10-260789 | 9/1998 |
| JP | 2003-084923 | 3/2003 |

OTHER PUBLICATIONS

V. Bohossian et al., Computing in the RAIN: A Reliable Array of Independent Nodes, pp. 1-20, Sep. 24, 1999.

P.M. Chen et al., RAID: High-Performance, Reliable Secondary Storage, ACM Computing Surveys, vol. 26, No. 2, pp. 146-185, Jun. 1994.

M. Holland et al., Parity Declustering for Continuous Operation in Redundant Disk Arrays, ACM 0-89791-535-6/92/0010/0023, pp. 23-35, Oct. 1992.

N.K. Ouchi, Two-Level DASD Failure Recovery Method, IBM Technical Disclosure Bulletin, vol. 36, No. 3, pp. 187-190, Mar. 1993.

D.A. Patterson et al., A Case for Redundant Arrays of Inexpensive Disks (RAID), ACM 0-89791-268-3/88/0006/0109 1998.

J.S. Plank, A Tutorial on Reed-Solomon Coding for Fault-Tolerance in RAID-like Systems, pp. 1-19, Feb. 19, 1999.

E.J. Schwabe et al., Evaluating Approximately Balanced Parity-Declustered Data Layouts for Disk Arrays, ACM 0-89791-813-4/96/05, pp. 41-54, 1996.

E.J. Schwabe et al., Flexible Usage of Parity Storage Space in Disk Arrays, ACM 0-89791-809-6/96/06, pp. 99-108, 1996.

L. Xu et al., X-Code: MDS Array Codes with Optimal Encoding, IEEE Trans. On Information Theory, vol. 45. No. 1, pp. 272-276, Jan. 1999.

M. Blaum et al., "MDS Array Codes with Independent Parity Symbols," IEEE Trans. on Information Theory, vol. IT-42, pp. 529 542, Mar. 1996.

M. Blaum et al., "The EVENODD Code and its Generalization," High Performance Mass Storage and Parallel I/O: Technologies and Applications,' edited by H. Jin et al., IEEE & Wiley Press, New York, Chapter 14, pp. 187 208, 2001.

M. Blaum et al., "EVENODD: An Efficient Scheme For Tolerating Double Disk Failures In A RAID Architecture," IEEE Trans. on Computers, vol. 44, No. 2, pp. 192-202, Feb. 1995.

International Search Report and Written Opinion for PCT/EP2004/051383 mailed Jul. 6, 2006.

Office Action in EP 04 766 141.8—1225 mailed Jul. 12, 2007, 3 pages.

* cited by examiner

AUTONOMIC PARITY EXCHANGE

CROSS-REFERENCE TO RELATED APPLICATIONS

The present patent application is a divisional patent application of U.S. patent application Ser. No. 10/619,648, entitled "Autonomic Parity Exchange," invented by Steven R. Hetzler et al. and filed Jul. 14, 2003 now U.S. Pat. No. 7,254,754. Additionally, the present application is related to patent application Ser. No. 10/619,641, entitled "Anamorphic Codes," patent application Ser. No. 10/619,633, entitled "Multi-path Data Retrieval From Redundant Array," and patent application Ser. No. 10/619,648, entitled "RAID 3+3," each co-assigned and filed concurrently with the parent patent application of the present divisional patent application, and the disclosure of each being incorporated by reference herein. The present application is also related to co-assigned patent application Ser. No. 10/600,593 entitled "Method for constructing erasure correcting codes whose implementation requires only exclusive ORs," and to co-pending and co-assigned patent application Ser. No. 11/747,887, entitled "RAID 3+3," filed May 12, 2007, and patent application Ser. No. 11/778,641, entitled "Autonomic Parity Exchange," filed concurrently herewith, of which each disclosure is also incorporated by reference herein.

BACKGROUND

1. Field

The subject matter disclosed herein relates to storage systems. In particular, the subject matter disclosed herein relates to a method for configuring a storage system comprising a plurality of arrays of storage units and thereby increasing the number of storage-unit failures that the storage system can tolerate without loss of data stored in the system.

2. Description of the Related Art

The following definitions are used herein and are offered for purposes of illustration and not limitation:

An "element" is a block of data on a storage unit.

A "base array" is a set of elements that comprise an array unit for an ECC.

An "array" is a set of storage units that holds one or more base arrays.

A "stripe" is a base array within an array.

n is the number of data units in the base array.

r is the number of redundant units in the base array.

m is the number of storage units in the array.

d is the minimum Hamming distance of the array.

D is the minimum Hamming distance of the storage system.

Large storage systems typically comprise multiple separate arrays of storage units. Each array is conventionally protected against a certain number of storage-unit failures (also called erasures) by an Erasure (or Error) Correcting Code (ECC) in, for example, a mirroring configuration or a RAID 5 (Redundant Array of Independent Disks Level 5) configuration. ECC codes provide redundant storage units that are local to each array, and increase reliability for a storage system by handling unit failures that are localized to a subset of the arrays.

Storage capacity of Hard Disk Drive (HDD)-based storage systems is increasing faster than improvements in component reliability. Consequently, minimum Hamming distance $d=2$ schemes, such as RAID 5 and mirroring techniques, no longer provide adequate protection for sufficient reliability at the system level. Alternative designs, such as RAID 6 (dual parity) at distance $d=3$, double mirroring at distance $d=3$, and RAID 51 at distance $d=4$, have been proposed to address deficiencies in system reliability. It is common practice in storage systems to provide spare units to decrease the system repair time and increase the maintenance interval. Adding spares, however, increases the cost of the system and decreases the storage efficiency.

Other approaches for improving system reliability include use of higher order parity codes. For example, J. S. Plank, "A Tutorial on Reed-Solomon Coding for Fault-Tolerance in RAID-like Systems," Software—Practice & Experience, 27(9), September 1997, pp. 995-1012, discloses an example of a Reed-Solomon code.

Additionally, E. J. Schwabe et al., "Evaluating Approximately Balanced Parity-Declustering Layouts in Disk Arrays," ACM 0-89791-813-4/96/05 1996, disclose data layouts for efficient positioning of redundant information for improved performance.

P. Chen et al., "RAID: High-Performance, Reliable Secondary Storage," ACM Computing Surveys, Vol. 26, June 1994, pp. 145-185, provide an overview of RAID. M. Holland et al., "Parity Declustering for Continuous Operation In Redundant Disk Arrays," Proceedings of the 5$^{th}$ International Conference on Architectural Support for Programming Languages and Operating Systems (ASPLOS-V), pp. 23-25, October 1992, disclose declustered parity for RAID systems. G. A. Alvarez et al., "Tolerating Multiple Failures in RAID Architectures," ACM 0-89791-901-7/97/0006 1997 describe the properties and construction of a general multiple parity array using 8-bit finite fields.

U.S. Pat. No. 5,579,475 to M. M. Blaum et al., entitled "Method and Means for Encoding and Rebuilding the Data Contents of Up to Two Unavailable DASDs in a DASD Array Using Simple Non-Recursive Diagonal and Row Parity," discloses the operation of a distance $d=3$ array. N. K. Ouchi, "Two-Level DASD Failure Recover Method," IBM Technical Disclosure Bulletin, Vol. 36:03, March 1993, discloses operations required for reconstructing data from a distance $d=3$ array having failures.

Nevertheless, some array designs, such as product codes (including RAID 51), have vulnerabilities to certain patterns of storage unit failures. These arrays behave somewhat as if they possess local redundancy.

What is needed is a technique to improve the reliability of a storage system by making local redundancy in an array to be globally available throughout a system of arrays. Additionally, what is needed is a technique to improve the reliability of a storage system that has sensitivity to patterns of storage unit failures. Further still, what is needed is a technique that allows maintenance of the storage system to be deferred for considerably longer than can be with a conventional storage system.

BRIEF SUMMARY

The subject matter disclosed herein provides a technique that improves the reliability of a storage system by making local redundancy in an array to be globally available throughout a system of arrays. Additionally, the subject matter disclosed herein provides a technique that mitigates the failure pattern sensitivity of a storage system. Further still, the subject matter disclosed herein provides a technique that allows maintenance of the storage system to be deferred for considerably longer than with a conventional storage system.

The advantages of the subject matter disclosed herein are provided by a method for increasing failure tolerance of a storage system having a plurality of arrays such that each array has a plurality of storage units. The arrays of the storage system include redundancy based on an erasure or error correcting code, such as a parity code, a Winograd code, a symmetric code, a Reed-Solomon code, an EVENODD code or a derivative of an EVENODD code. The failure tolerance of a storage system is given by the minimum Hamming distance D of the system. The minimum distance of the system is, accordingly, the minimum of all the minimum Hamming distances of the respective stripes, that is, $D=\min(d_i)$. A donor array is selected from the plurality of arrays when the difference between a minimum distance of the donor array and a minimum distance of a recipient array is greater or equal to 2. A donor storage unit is selected in the donor array based on a minimal performance impact on the donor array. A recipient storage unit is selected from the recipient array. At least a portion of lost information is then rebuilt from the recipient array onto the selected storage unit in the donor array. The recipient information is selected based on an improved performance of the recipient array. The selected storage unit is indicated to the donor array as having been donated before the lost information is rebuilt on the selected storage unit. Preferably, the minimum Hamming distance of the recipient array is $d \geq 2$ before the donor array is selected from the plurality of arrays. When a spare storage unit becomes available, the spare storage unit is assigned to a selected array in a conventional manner.

When a storage unit in the donor array fails during the step of rebuilding at least a portion of recipient information from the recipient array on the selected storage unit, the step rebuilding is terminated and a second donor array is selected. At least a portion of lost recipient information from the recipient array is rebuilt on the selected storage unit in the second donor array. The selection of the second donor array proceeds by re-evaluating the conditions described previously.

The subject matter disclosed herein also provides a method of increasing the failure tolerance of an array of storage units that is vulnerable to selected patterns of failures. According to the subject matter disclosed herein, a recipient storage unit is selected from the array of storage units subsequent to a storage unit failure. A donor storage unit is selected from the array of storage units such that a failure tolerance of the array is increased following a rebuild operation. Lastly, at least a portion of lost recipient information is rebuilt onto the donor storage unit. When a spare unit becomes available, the spare unit is assigned to the array in a conventional manner.

Further still, the subject matter disclosed herein provides a data storage system having a plurality of arrays and a system array controller. Each array has a plurality of storage units and includes redundancy based on an erasure or error correcting code, such as a parity code, a Winograd code, a symmetric code, a Reed-Solomon code, an EVENODD code or a derivative of an EVENODD code. The system array controller is coupled to each array and detects a failure of a storage unit in a first array of the plurality of arrays. The system controller then selects a storage unit in a second array of the plurality of arrays when a difference between a minimum distance of the second array and a minimum distance of the first array is greater or equal to 2. At least a portion of lost information from the first array is rebuilt onto the selected storage unit of the second array. Each storage unit can be an HDD, a volatile Random Access Memory device, a non-volatile Random Access Memory device, an optical storage device, or a tape storage device.

The subject matter disclosed herein also provides a data storage system having an array of a plurality of storage units and an array controller. The array includes redundancy based on an erasure or error correcting code, such as a parity code, a Winograd code a symmetric code, a Reed-Solomon code, an EVENODD code or a derivative of an EVENODD code. The array is also vulnerable to selected patterns of failures and/or a non-uniform failure probability. The array controller is coupled to the array and detects a failure of a first storage unit in the array. The array controller then selects a second storage unit in the array such that a failure tolerance of the array is increased following a rebuild operation, and rebuilds at least a portion of information from the first storage unit onto the second storage unit. The second storage unit is selected based on a failure pattern of the array and/or based on a predetermined target pattern. The minimum Hamming distance of the array is $d \geq 2$ before the array controller selects the second storage unit, and is increased upon completion of rebuilding at least a portion of information from the first storage unit onto the second storage unit. Each storage unit can be an HDD, a volatile Random Access Memory device, a non-volatile Random Access Memory device, an optical storage device or a tape storage device.

BRIEF DESCRIPTION OF THE DRAWINGS

The subject matter disclosed herein is illustrated by way of example and not by limitation in the accompanying figures in which like reference numerals indicate similar elements and in which:

FIG. 2 shows an exemplary set of two arrays for illustrating the subject matter disclosed herein;

FIG. 3 shows the arrays of FIG. 2 following failure of two drives in one of the arrays for illustrating the subject matter disclosed herein;

FIG. 4 shows the arrays of FIG. 2 following an APX operation according to the subject matter disclosed herein;

DETAILED DESCRIPTION

Figure 1A:
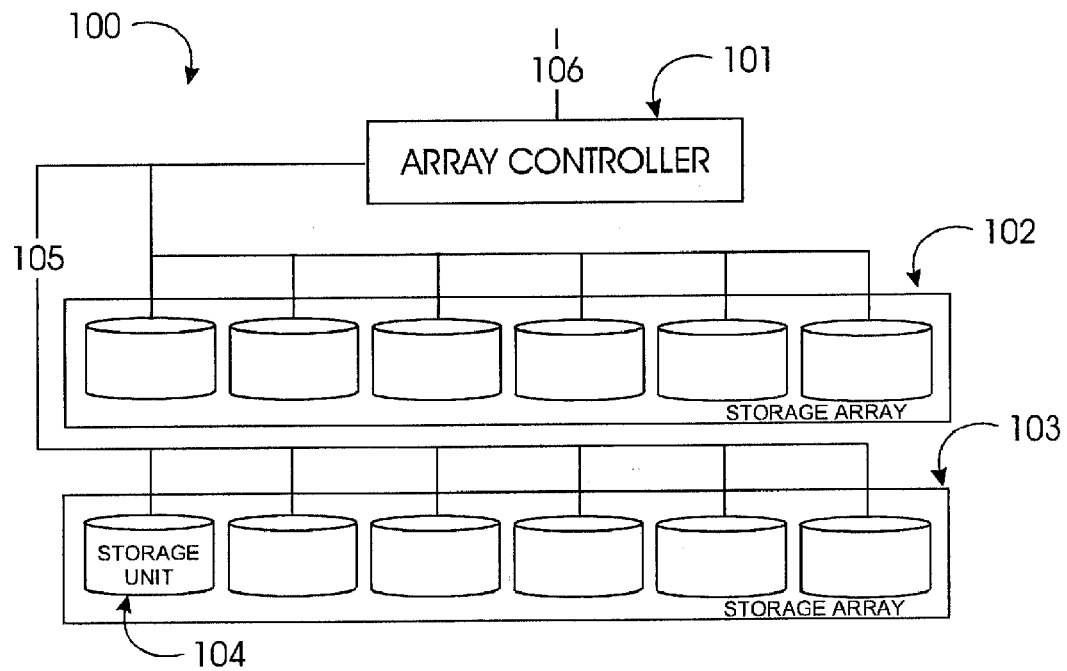
FIG. 1a shows a typical configuration of a storage system with a plurality of arrays connected to a common storage controller.

The subject matter disclosed herein dramatically improves the reliability of a storage system and allows maintenance of the storage system to be deferred for considerably longer than can be with a comparable storage system without parity exchange. Thus, the subject matter disclosed herein provides a significant reliability improvement over the degree of reliability provided by RAID systems. In contrast to RAID systems, which treat each array of a multi-array storage system as an individual entity, the subject matter disclosed herein globally couples the individual arrays of a multi-array storage system, thereby allowing the redundancy of one array to be utilized by another array. Such a process is referred to herein as an autonomic parity exchange (APX) or as an APX operation.

According to the subject matter disclosed herein, an APX operation allows local redundancy in an array to be globally available throughout a system of arrays, thereby increasing system reliability as the number of storage units increases. APX also reduces or eliminates the need for spare storage units.

To illustrate the benefits of the subject matter disclosed herein using a specific example, consider a 48-unit storage system comprising eight arrays of six storage units and having no spare storage units. Further, the exemplary storage system uses a symmetric code having distance d=4. A symmetric code has an equal number of data units and redundant units, and the ability to recover from the loss of any combination of half the units. With APX, the distance of the storage system remains at D=2 with up to nine storage-unit failures. Assuming that the APX operations can complete with fewer than two failures during the operations, the storage systems reaches D=1 with ten failures. In contrast, a RAID 6 system using three arrays of sixteen storage units reaches D=1 with as few as two storage-unit failures. In further contrast, a RAID 51 system using three arrays of sixteen storage units reaches D=1 with as few as three storage-unit failures.

Moreover, a storage system utilizing APX gracefully degrades as failures accumulate, thereby permitting maintenance of the system to be deferred with an accompanying significant cost savings. Accordingly, the annual warranty costs for a storage system utilizing APX will be significantly less than the annual warranty cost for a comparable storage system without APX. For a conventional system, service is typically requested when the spare-storage-unit pool is exhausted. When APX is used, service could be requested after up to nine unit failures for the exemplary system. Thus, when APX is used, the system can maintain a given distance over a longer interval compared to a system without APX.

APX allows arrays within a set of arrays to exchange redundancy, thereby overcoming exposure to failures that are concentrated on a single array of the set of arrays. For example, if a first array has a minimum Hamming distance that is less than the minimum Hamming distance of a second array by 2 or more, the second array can donate a storage unit to the first array. Afterward, the failure tolerance of the first array will be increased and the failure tolerance of the second array will be reduced, but to a level that is not less than the first array. Accordingly, the minimum distance of the system will be increased, thereby increasing the failure tolerance of the system.

FIG. 1a shows an exemplary storage system, indicated generally as 100, comprising two storage arrays 102 and 103 that are connected to a common array controller 101. Storage arrays 102 and 103 comprise multiple storage units 104 and communicate with array controller 101 over interface 105. Array controller 101 communicates to other controllers and host systems over interface 106. Such a configuration allows an array controller to communicate with multiple storage arrays.

Figure 1B:
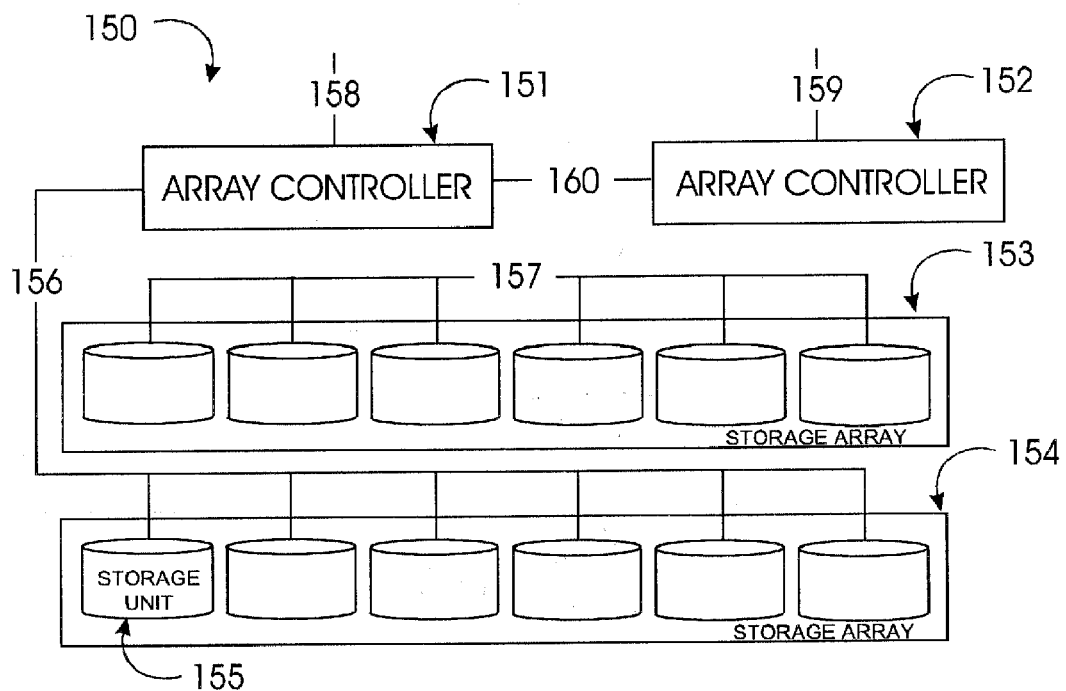
FIG. 1b shows a typical configuration of a storage system with a plurality of arrays connected to separate storage controllers.

FIG. 1b shows an exemplary storage system, indicated generally as 150, comprising two storage arrays 153 and 154, that are respectively connected to different array controllers 152 and 151. Storage array 153 communicates with array controller 152 over interface 157, and storage array 154 communicates with array controller 151 over interface 156. Array controllers 151 and 152 respectively communicate with other array controllers and storage systems over interfaces 158 and 159. Also shown in FIG. 1b is a communication connection 160 that allows array controllers 151 and 152 to communicate with each other.

The array controllers shown in FIGS. 1a and 1b may be designed as hardware or software controllers. The term controller will be used herein generally to refer to any of the configurations described above.

Figures 2, 3, 4:
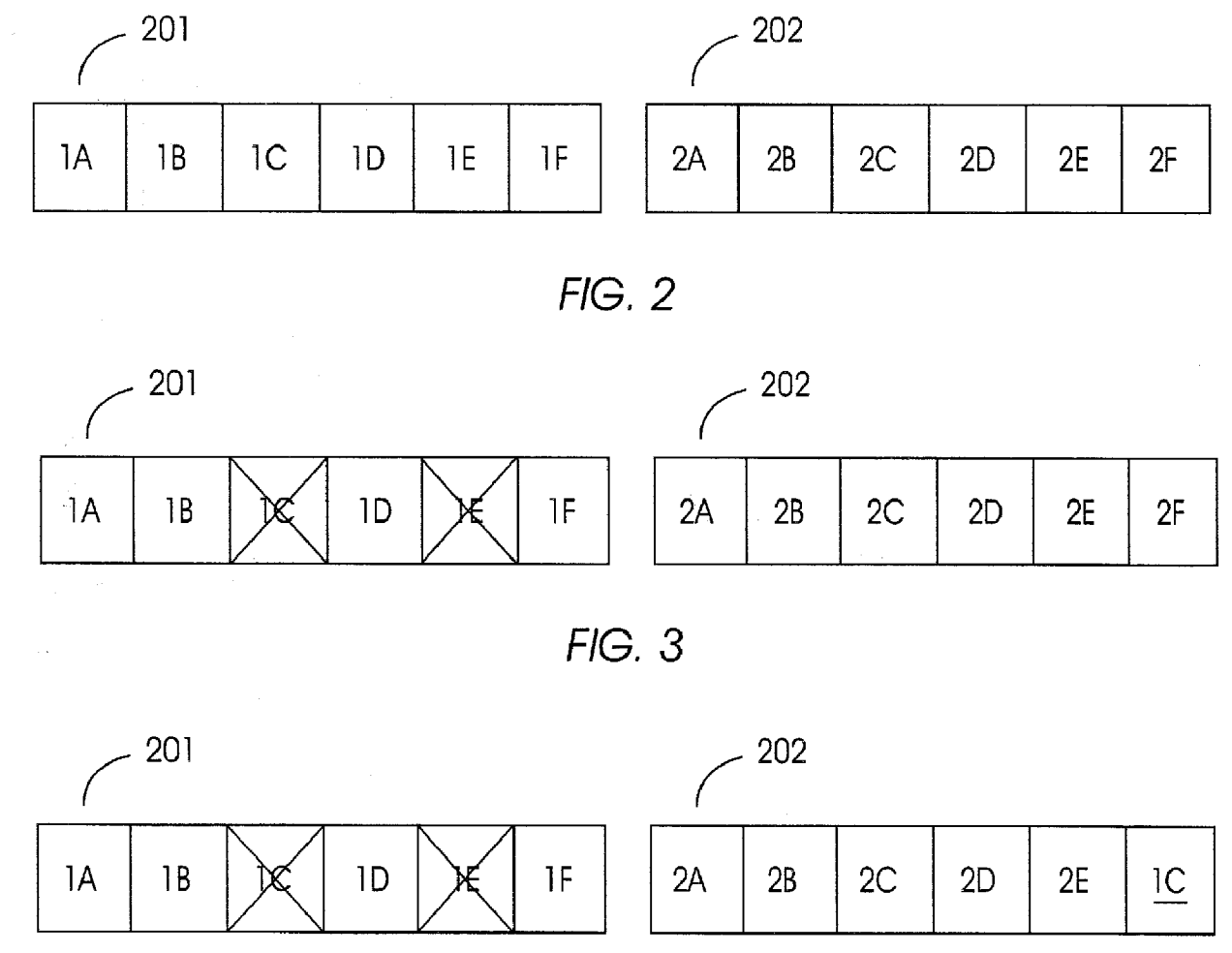

FIG. 2 shows an exemplary set of two arrays 201 and 202 for illustrating the subject matter disclosed herein. Array 201 includes storage units 1A-1F, and array 202 includes storage units 2A-2F. Storage units A, B and C of each array are data storage units and storage units D, E and F of each array are redundant storage units with an MDS code. Accordingly, both arrays 201 and 202 have a minimum Hamming distance d=4. The configuration shown in FIG. 2 is referred to as a symmetric code in which the number of data storage units equals the number of redundant storage units. Redundancy is calculated so that any three unit failures can be corrected by the symmetric code. Erasure or Error correcting codes (ECCs), such as parity codes, Winograd codes, symmetric codes, Reed-Solomon codes, EVENODD codes and derivatives of EVENODD codes, can be used for generating the redundancy. As used herein, the term "distance" means the minimum Hamming distance.

FIG. 3 shows the arrays of FIG. 2 following failure of storage units 1C and 1E in array 201. After storage units 1C and 1E fail, array 201 has distance d=2, while array 202 still has distance d=4. Array 201 can tolerate only one further failure without the possibility of a data loss event. Array 202 can still tolerate three failures without the possibility of a data loss event. The overall system distance is that of array 201, i.e., distance D=2. The overall failure tolerance of the system can be increased by rebalancing the redundancy using APX, because the distance of the system is increased from D=2 to D=3.

Rebalancing the redundancy is achieved by donating a storage unit contained within array 202 (referred to as the donor array), and then providing the donated storage unit to array 201 (referred to as the recipient array) as if the donated storage unit were a spare unit. The donor array must be made aware that the donated storage unit is no longer part of the donor array to prevent the donor array from reading or writing data on the donated unit. It may be beneficial to assign one of the failed storage units from the recipient array to the donor array so that both arrays maintain a constant number of storage units and maintain knowledge of the failed units. No information can be written to the donated unit by the donor array. The system can select which storage unit to donate. The primary criterion for selecting a donor unit is based on selecting a donor unit that has the least impact on the donor array reliability. A secondary criterion is based on selecting the storage unit having the least impact on performance, such as the unit with the most expensive redundancy calculation. The system can select which data from the failed units to rebuild onto the donated unit. The primary criterion for selecting the information to be rebuilt is based on the information set that provides the greatest increase in reliability. A secondary criterion is to select the information set that provides the best array performance following the rebuild operation. In the example of FIG. 3 above, recipient array 201 will have the best performance by rebuilding the information set of unit 1C because unit 1C is a data unit. Similarly, donor array 202 will have the least performance impact by donating a unit storing redundant information, such as unit 2F. In both cases, after the APX operation, read commands could thus be processed without the need to reconstruct the data from the redundant units of the storage arrays 201 and 202.

Donating a storage unit from a donor array to a recipient array requires that the storage system be able to assign storage units from one array to another array. When the donor and recipient arrays are connected to a common array controller 101, as shown in FIG. 1a, then controller 101 can perform this operation internally. When the donor and recipient arrays are connected to separate controllers 151 and 152, as shown in FIG. 1b, then controllers 151 and 152 exchange information. For example, the controllers could expose the individual drives over communication connection 160, such as in the manner of a Just a Bunch of Disks (JBOD) array configuration. Alternatively, the controllers could exchange information regarding the data to be read and written from the locations on the storage units involved.

It is possible to achieve the donation by artificially indicating that the donated unit has failed in the donor array. It is, however, beneficial to perform the donation in a piece-wise manner. Segments of data that have been written with recipient array data during the rebuild belong to the recipient. Until the rebuild has completed, the donor array may be permitted to write to the donated unit to keep data in the remaining segments up to date. In the situation in which a storage unit in the donor array fails during the parity exchange, it may be preferred to terminate the donation operation, and initiate a new donation operation with a different donor array. The donor array can then rebuild onto the previously donated segments to increase the distance of the array. For example, if the failure occurs during the initial portion of the donation operation, this method of reversing the donation and initiating a new donation should decrease the duration that the system is operating at reduced distance.

Once a spare storage unit becomes available, such as through maintenance, it can be assigned to replace any of the failed units. Information is rebuilt onto the spare in a well-known manner. Assigning one of the failed units of the recipient array to the donor array can facilitate this operation because it indicates to which array a failed unit belongs.

FIG. 4 shows the arrays of FIG. 2 following an APX operation according to the subject matter disclosed herein. Rebuilt data in FIG. 4 is underlined. While there are still two failed storage units in the system, there is only one failed storage unit in each array. For the system configuration of FIG. 4, each array now has distance d=3 and can tolerate two further failures without possible loss of data. The overall distance of the system is now D=3.

Using APX, a storage system can tolerate more failures than would otherwise be the case. In the example of FIGS. 2-4, the first point of system failure would be at four unit failures without utilizing APX. In contrast, when APX is used, the first point of system failure is six unit failures. The improvement has not been achieved by requiring additional redundancy or sparing, but by adjusting global assignment of redundancy within the storage system to meet observed storage-unit-failure conditions. The improvement provided by APX increases with increasing number of arrays in a system.

In a storage system having equal distance arrays, the donor arrays must be at least distance d=3 so that an APX operation can be performed. That is, a donor array must have distance at least 2 greater than the distance of the recipient array. Generally, an APX operation is preferably performed when a recipient array is at distance 2 or greater, thereby protecting against hard errors or a further storage unit failure during an APX operation.

Many conventional systems, such as RAID 5, use distributed parity (also called "de-clustered parity") for spreading access patterns. In such systems, each storage unit has portions assigned to each unit type (e.g., data 1, data 2, redundancy 1, etc.). APX can also be applied to systems using distributed parity. In such a case, selection of a donor storage unit is less critical because the redundancy is spread across all the units. The system can select to simply rebuild any one of the recipient's failed storage units.

When there are multiple choices for donor arrays, the selection criteria for a donor array can be based on considerations such as utilization, age of devices, and previous error history.

The illustrative example shown in FIGS. 2-4 performs parity exchange with arrays in which the number of redundant units is the same as the number of data units. When the number of storage units in the array is greater than the number of storage units in the base array, an APX operation can be performed in combination with a dodging operation, such as disclosed by application Ser. No. 10/619,641, which is incorporated by reference herein, to further increase the system reliability.

Figure 5:
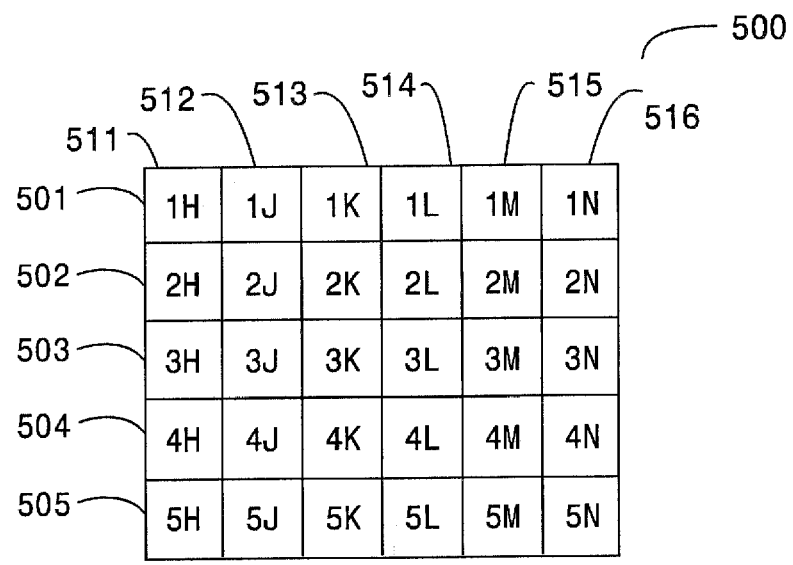
FIG. 5 shows an exemplary array that has sensitivity to patterns of storage unit failures.
Figures 6, 7:
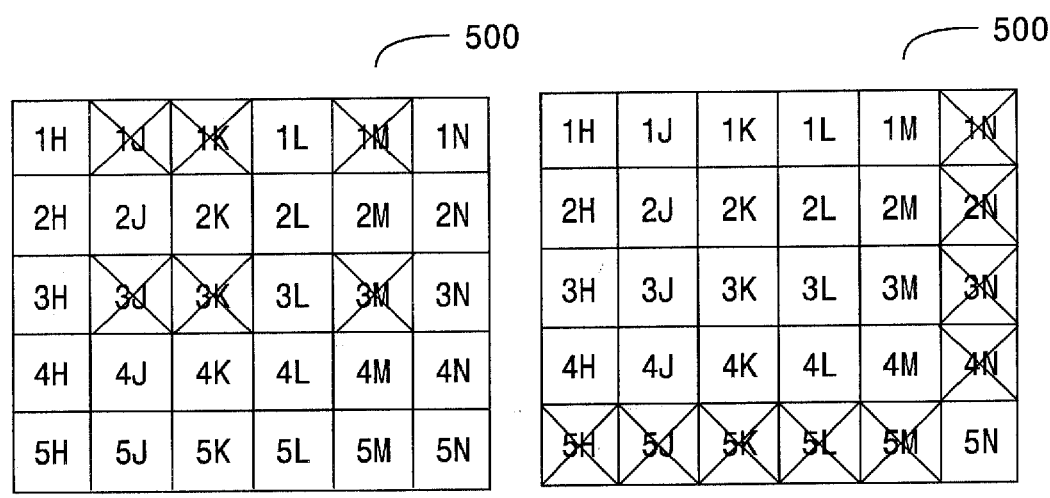
FIG. 6 shows an exemplary pattern of six storage unit failures of the array of FIG. 5 that leads to data loss.
FIG. 7 shows an exemplary target pattern of nine storage unit failures of the array of FIG. 5 that has distance $d=3$.

Some array designs are sensitive to patterns of unit failures. In such arrays, both the donor unit and recipient unit may come from the same array. A donor unit can be selected on the basis of the array configuration. FIG. 5 shows a product code array 500 comprising 30 storage units, in which rows 501-505 form RAID 6 arrays (d=3) and columns 511-516 form RAID 5 arrays (d=2). In array 500, D=6 with 14 redundant drives. Only certain positional arrangements of six failures, however, will cause the array to fail, as illustrated in FIG. 6, in which storage units 1J, 1K, 1M, 3J, 3K and 3M have failed. The pattern of failures can be recognized as three failures in a first row matching three failures in a second row. This failure tolerance of the system can be increased by using APX. The system would choose the donor unit and the recipient unit in such a manner, thereby avoiding these patterns and returning the array back to a D=3 condition.

For the example of FIG. 5, the system can maintain D=3 with nine failures when they are in an arrangement such as shown in FIG. 7. Here, the array has nine failed units, 1N, 2N, 3N, 4N, 5H, 5J, 5K, 5L and 5M. The system can choose a target pattern that has a high failure tolerance. As failures occur, donor units are selected from the target pattern and assigned to failed recipients that are not part of the target pattern. For the example of FIG. 5, an APX operation can be performed several times such that the array can tolerate at least ten failures before reaching D=2. The effective distance has thereby been increased from D=6 to D=12 by utilizing APX. APX allows the maintenance to be deferred until ten of the 30 units have failed, with the array remaining at least D=2. Without APX, maintaining D=2 can require maintenance with as few as four unit failures.

The terms "failure" and "pattern" as used herein refer to the erasure of information from the logical position in the array, not the physical position. Such non-MDS arrays can be formed from product codes as illustrated, low density parity codes, non-uniform graph codes, or any codes that have particular pattern vulnerabilities.

APX can be used beyond simply increasing the minimum distance of a storage system. Many other factors may be included in determining whether to perform APX and to choose donors and recipients. For example, the individual failure probabilities of components when they are non-uniform, the combinations of failures that lead to data loss, and the effects on system performance may all be considered. In such cases, the minimum distance of the system could remain unchanged following APX.

APX can be used with other array types having minimum distance d≧3. Additionally, a smaller array size allows APX to be used more efficiently, and allows large systems consisting of small arrays to achieve high failure tolerance. When a storage system has a spare pool, it is best to perform rebuilds onto the spare pool before performing an APX operation.

APX can also be performed on a subset of the data on a storage unit. For example, in some configurations the rebuild time may be decreased. Consider the example of FIG. 4. Instead of rebuilding the contents of unit 1C onto unit 2F, it may be beneficial to rebuild half of unit 1C onto half of unit 2F, and the other half of unit 1E onto half of unit 2E. The net result would be both arrays at D=3, but the rebuild time may be reduced because the same amount of data is being rebuilt, but two donor drives are being used. Other combinations are clearly possible as well.

While the subject matter disclosed herein has been described in terms of storage arrays formed from HDD storage units, the subject matter disclosed herein is applicable to storage systems formed from arrays of other memory devices, such as Random Access Memory (RAM) storage devices (both volatile and non-volatile), optical storage devices, and tape storage devices. Additionally, it is suitable to virtualized storage systems, such as arrays built out of network-attached storage. It is further applicable to any redundant system in which there is some state information that associates a redundant component to particular subset of components, and that state information may be transferred using a donation operation.

While the subject matter disclosed herein has been described with respect to specific examples including presently preferred modes of carrying out the subject matter disclosed herein, those skilled in the art will appreciate that there are numerous variations and permutations of the above described systems and techniques that fall within the spirit and scope of the subject matter disclosed herein as set forth in the appended claims.

What is claimed is:

1. A data storage system, comprising:
an array comprising a plurality of storage units, the array being vulnerable to selected patterns of failures; and
an array controller coupled to the array, the array controller detecting a failure of a first storage unit in the array, selecting a second storage unit in the array such that a failure tolerance of the array is increased following a rebuild operation, and rebuilding at least a portion of information from the first storage unit onto the second storage unit, wherein the minimum Hamming distance of the array is $d \geq 2$ before the array controller selects the second storage unit.

2. The data storage system according to claim 1, wherein the second storage unit is selected based on a failure pattern of the array.

3. The data storage system according to claim 1, wherein the second storage unit is selected based on a predetermined target pattern.

4. The data storage system according to claim 1, wherein the array comprises redundancy based on an erasure or error correcting code.

5. The data storage system according to claim 4, wherein the erasure or error correcting code comprises a parity code.

6. The data storage system according to claim 4, wherein the erasure or error correcting code comprises a Winograd code.

7. The data storage system according to claim 4, wherein the erasure or error correcting code comprises a symmetric code.

8. The data storage system according to claim 4, wherein the erasure or error correcting code comprises a Reed-Solomon code.

9. The data storage system according to claim 4, wherein the erasure or error correcting code comprises an EVENODD code.

10. The data storage system according to claim 4, wherein the erasure or error correcting code comprises a derivative of an EVENODD code.

11. The data storage system according to claim 1, wherein the array comprises a non-uniform failure probability.

12. The data storage system according to claim 1, wherein each storage unit comprises one of a Hard Disk Drive, a volatile Random Access Memory device, a non-volatile Random Access Memory device, an optical storage device, and a tape storage device.

13. The data storage system according to claim 1, wherein the array comprises redundancy based on a product of a plurality of erasure or error correcting codes.

14. The data storage system according to claim 13, wherein at least one of the erasure or error correcting codes comprises a parity code.

15. The data storage system according to claim 13, wherein the erasure or error correcting code comprises a Winograd code.

16. The data storage system according to claim 13, wherein at least one of the erasure or error correcting codes comprises a parity code.

17. The data storage system according to claim 13, wherein at least one of the erasure or error correcting codes comprises a symmetric code.

18. The data storage system according to claim 13, wherein at least one of the erasure or error correcting codes comprises a Reed-Solomon code.

19. The data storage system according to claim 13, wherein at least one of the erasure or error correcting codes comprises an EVENODD code.

20. The data storage system according to claim 13, wherein at least one of the erasure or error correcting codes comprises a derivative of an EVENODD code.

21. A data storage system, comprising:
an array comprising a plurality of storage units, the array being vulnerable to selected patterns of failures; and
an array controller coupled to the array, the array controller detecting a failure of a first storage unit in the array, selecting a second storage unit in the array such that a failure tolerance of the array is increased following a rebuild operation, and rebuilding at least a portion of information from the first storage unit onto the second storage unit, wherein the minimum Hamming distance of the array is increased upon completion of rebuilding at least a portion of information from the first storage unit onto the second storage unit.

22. The data storage system according to claim 21, wherein the array comprises redundancy based on an erasure or error correcting code.

* * * * *